Figure 4:
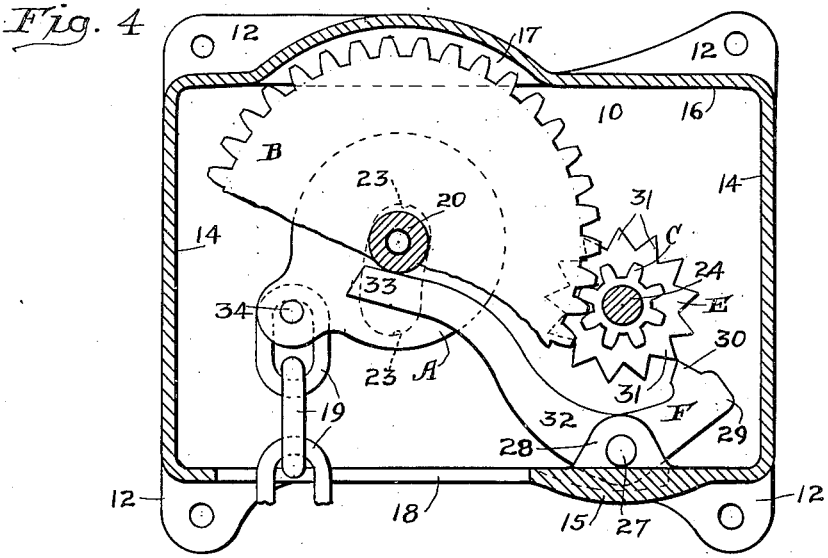

May 16, 1950      G. E. DATH      2,507,761
HAND BRAKE FOR RAILWAY CARS
Filed Oct. 10, 1947      2 Sheets-Sheet 1
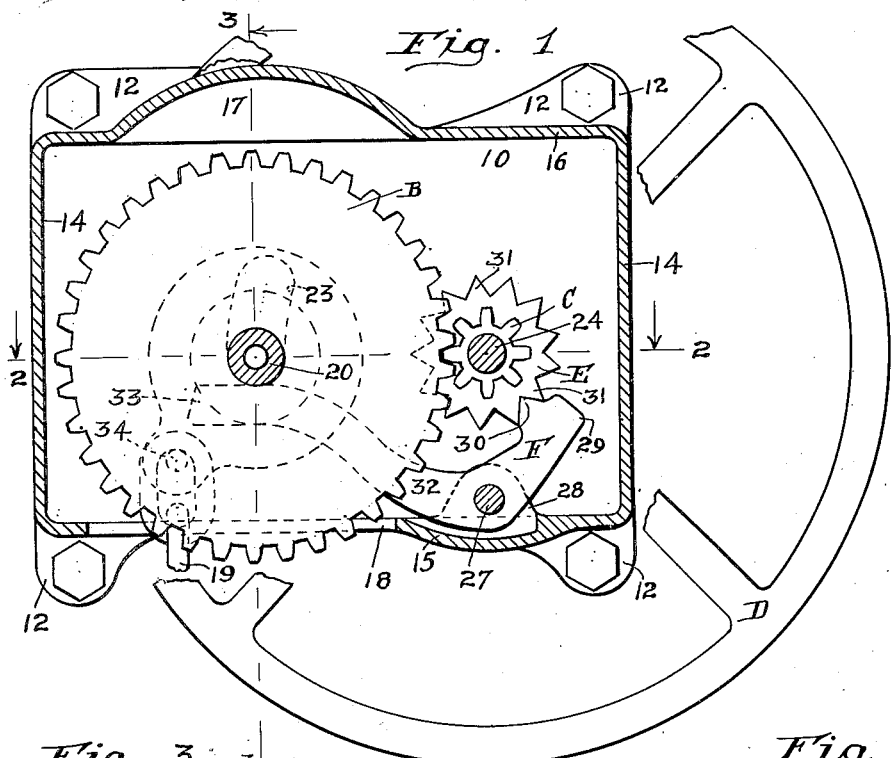
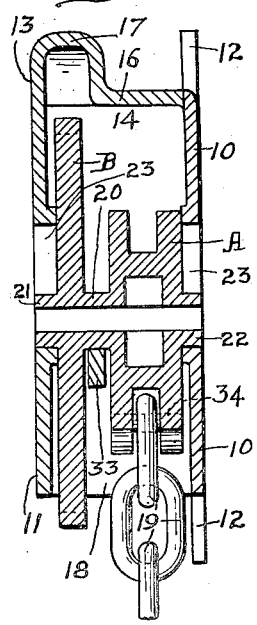
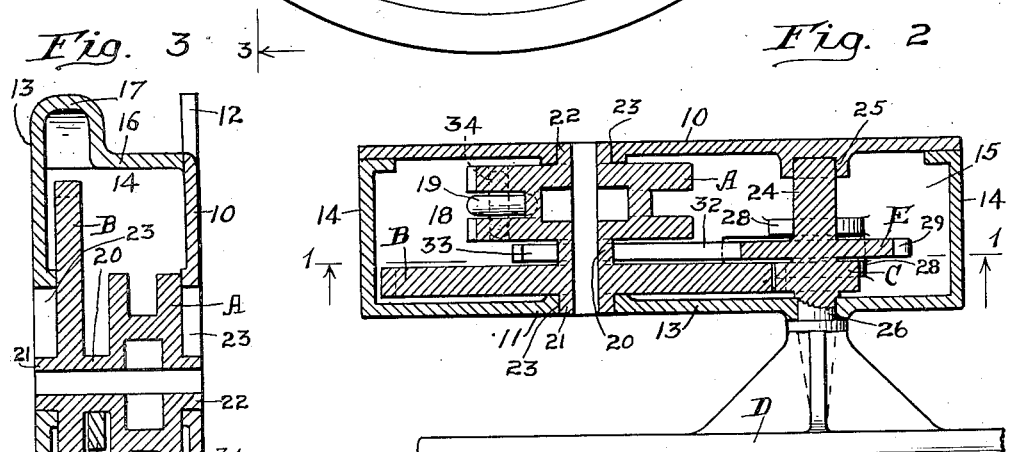
Inventor:
George E. Dath.
By Henry Fuchs
Atty.

May 16, 1950            G. E. DATH            2,507,761

HAND BRAKE FOR RAILWAY CARS

Filed Oct. 10, 1947            2 Sheets-Sheet 2

Inventor:
George E. Dath.
By Henry Fuchs
Atty.

Patented May 16, 1950

2,507,761

UNITED STATES PATENT OFFICE 2,507,761

HAND BRAKE FOR RAILWAY CARS

George E. Dath, Mokena, Ill., assignor to W. H. Miner, Inc., Chicago, Ill., a corporation of Delaware Application October 10, 1947, Serial No. 779,155

14 Claims. (Cl. 74—505)

This invention relates to improvements in hand brakes of the power multiplying gear type, especially adapted for use on railway cars.

One object of the invention is to provide a hand brake mechanism of the character indicated, wherein ratchet means is employed for holding the brake mechanism in its applied position, which ratchet means is designed so that the brake may be manually operated to release or back-off the same against the action of said ratchet means.

A further object of the invention is to provide a hand brake mechanism including a rotary chain winding member and means for holding said winding member against rotation in chain unwinding direction, comprising an element rotatable with said chain winding member, and means having gripping engagement with said element, wherein the gripping force exerted on the rotary element is ample to hold the brakes in applied condition, but not sufficiently great to oppose manual operation of the brakes in either applying or releasing direction, thereby permitting the brakes to be manually applied or released while the gripping means remains operative to hold the brakes set against release.

Still another object of the invention is to provide a hand brake mechanism including a rotary chain winding member, and ratchet means for holding the winding member against rotation in chain unwinding direction, comprising a rotary ratchet wheel and a cooperating holding dog, wherein the ratchet means is designed so that the brakes may be manually operated against the resistance to rotation afforded by said ratchet means to impart rotation to the winding member to either apply or release the brakes.

A more specific object of the invention is to provide a hand brake mechanism comprising a rotary chain winding member, a ratchet wheel rotatable with said member, and a pivoted locking dog having a long and a short arm, said short arm having ratcheting engagement with the ratchet wheel, and the drum being supported on the long arm at the outer end thereof, whereby the weight of the drum tends to urge the dog toward and against the ratchet wheel, and wherein the force with which the dog is pressed against the wheel is always proportionate to the pull exerted on the drum by the brake chain.

Other objects of the invention will more clearly appear from the description and claims hereinafter following.

Figure 5:
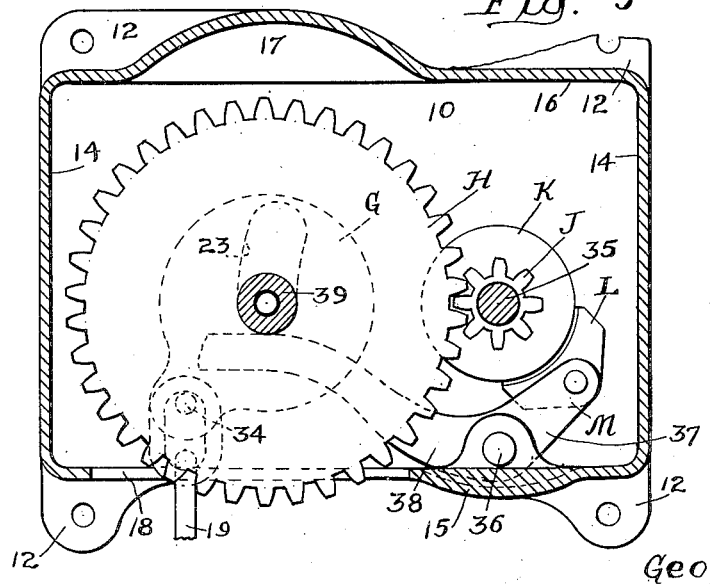

In the accompanying drawings forming a part of this specification, Figure 1 is a vertical sectional view of my improved brake mechanism, said view corresponding substantially to the line 1—1 of Figure 2, showing the brake mechanism in position for application to the vertical end wall of a railway car. Figure 2 is a horizontal sectional view, corresponding substantially to the line 2—2 of Figure 1. Figure 3 is a transverse, vertical sectional view, corresponding substantially to the line 3—3 of Figure 1. Figure 4 is a view, similar to Figure 1, partly broken away, showing the locking dog depressed during ratcheting action. Figure 5 is a view, similar to Figure 1, illustrating another embodiment of the invention.

In carrying out my invention, I preferably enclose the parts of the hand brake mechanism in a sectional two part housing, which is adapted to be mounted on the vertical end wall of a railway car. The two part housing comprises a back plate 10 and a cover member 11. The back plate 10 is of substantially rectangular outline and has projecting top and bottom securing lugs 12—12 and 12—12 by which the housing is fixed to the wall of the car. The cover member 11 of the housing comprises a vertical front wall 13, inwardly extending vertical side walls 14—14, which are flanged at their inner ends, a horizontal bottom wall 15, and a horizontal top wall 16 having a hollow arched section 17 at the front portion thereof adapted to accommodate the gear wheel member of the brake mechanism for upward movement. The cover member 11 is fixed to the back plate 10 in any well-known manner, being preferably welded thereto at the flanged ends of the side walls 14—14 and the rear edges of the bottom and top walls 15 and 16 thereof. The bottom wall 15 is cut out to provide an opening 18 for the usual brake chain, which is indicated by 19. As is well known, the brake chain 19 leads to the brake mechanism proper of the car, not shown, which includes the usual brake shoes to which the chain is connected.

Referring first to the embodiment of the invention illustrated in Figures 1 to 4 inclusive, my improved hand brake mechanism comprises broadly a chain winding drum A, a gear wheel B rotatable with the drum, a pinion C meshing with the gear wheel, a hand wheel D for rotating the pinion, a ratchet wheel E rotatable with the pinion, and a pivoted locking dog F engaging the ratchet wheel.

The chain winding drum A and the gear wheel B are directly connected to each other by a short shaft section 20, these parts being preferably cast in one piece. The drum and the gear wheel are further respectively provided with outwardly projecting trunnion members 21 and 22, which are axially aligned with the shaft section 20 and form, in effect, extended shaft portions for rotatably supporting the combined drum and gear casting. In order to lighten the weight of this casting, the drum A, shaft section 20, and the trunnions 21 and 22 are preferably made hollow, as shown. The drum A, together with the connected gear wheel B, is guided for movement in up and down direction by arc-shaped, upwardly extending, aligned slots 23—23 in the front wall 13 and the back plate 10, within which slots the trunnions 21 and 22 of these parts are engaged and guided.

The pinion C and the ratchet wheel E are mounted to one side of the drum A and gear wheel B, being carried on a shaft member 24 journaled in bearing openings 25 and 26 in the back plate 10 and the front wall 13 of the housing. The shaft member 24 is preferably formed integral with the pinion and ratchet wheel and extends entirely through and projects beyond the front wall 13 of the housing to accommodate the hand wheel D, which is fixed to said projecting end in any suitable manner. The pinion C is aligned with the gear wheel B and meshes therewith, and the ratchet wheel E is opposed to the shaft section 20, which connects the drum and the gear wheel.

The locking dog F is pivotally supported between its ends below the ratchet wheel E by a pivot pin 27 extending through said dog and supported at its opposite ends in upstanding ears 28—28 on the bottom wall 15 of the housing. The head portion of the dog F, which head portion is indicated by 29, is in the form of a relatively short, upwardly inclined arm extending from the pivotal axis of the dog, and carries a tooth 30, which engages with the teeth 31—31 of the ratchet wheel E. The tail portion 32 of the dog, is in the form of a relatively long lever arm extending from the pivotal axis of the dog in direction opposite to the arm which forms the head 29 of the dog. The tail portion of the arm 32 of the dog is curved or bowed upwardly between its ends and terminates in a substantially straight, outer end portion 33. The end portion 33 of the arm 32 extends into the space between the gear wheel B and the drum A and is engaged underneath the shaft section 20 of the wheel and drum to support the same. As will be evident, inasmuch as the drum A is supported on the arm 32 of the dog, the weight of the former holds the dog engaged with the ratchet wheel. The ratchet teeth 31—31 of the ratchet wheel E and the cooperating tooth 30 of the dog F are so designed that ratcheting action will be had when the ratchet wheel is rotated in either direction, the outwardly converging side faces of each tooth 31 of the ratchet wheel being inclined to the same degree with respect to a radial plane extending through the axis of rotation of the ratchet wheel and the apex of the tooth, and the tooth 30 of the dog having the converging side faces thereof correspondingly inclined.

The drum A, as shown, is of the well-known grooved type to accommodate the links of the chain 19, which is anchored to the drum by a pin 34, extending through the end link of the chain and the flanges of the grooved portion of said drum.

The operation of my improved hand brake mechanism during a chain tightening operation is as follows: The hand wheel D is rotated in clockwise direction, as viewed in Figure 1, thereby effecting rotation of the pinion C, and through the gear wheel B, which meshes with the pinion, rotation of the chain winding drum in contraclockwise direction, thereby winding the chain on the same. During this action, the dog F ratchets over the wheel E, being yieldingly held in engagement with the teeth of the wheel by the weight of the drum on the lever arm 32 of the dog. As will be evident, as the brakes are being tightened, the tension on the chain increases, thus exerting an additional downward pull on the drum, thereby increasing the pressure applied to the lever arm 32 of the dog, the pressure applied to the dog to resist rotation of the ratchet wheel being thus at all times proportionate to the load which it must hold in opposing release of the brakes. The inclinations of the engaging faces of the cooperating teeth of the ratchet wheel and dog are such that the pressure exerted on the dog by the drum A is adequate to hold the brakes set, and only slight additional force exerted by the operator on the hand wheel D is required to overcome the resistance between the cooperating teeth, thereby permitting the drum to be rotated in either chain winding direction to tighten the brakes or in chain unwinding direction to release the brakes.

Referring next to the embodiment of the invention illustrated in Figure 5, the construction is the same as that shown in Figures 1 to 4 inclusive with the exception that friction clutch means, instead of ratchet means, is employed to hold the brakes against release.

My improved hand brake mechanism, as shown in Figure 5, comprises a chain winding drum G, a gear wheel H, a pinion J, a clutch wheel K, a clutch shoe L, and a lever M. The drum G, the gear wheel H, and the pinion J, are identical with the corresponding parts A, B, and C of the brake mechanism hereinbefore described. The pinion J is rotated through the medium of the usual hand wheel, not shown, similar to the hand wheel D, being connected to the pinion by a shaft 35.

The clutch wheel K is fixed to the shaft 35 and is engaged by the shoe L carried by the lever M, the shoe being pivotally supported at the outer end of the lever M. The lever M is pivoted between its ends on a pin 36, thus presenting long and short arms 37 and 38 extending oppositely from the pivotal axis thereof. The long arm 37 and the short arm 38 are identical with the long arm or tail portion 32, and the short arm or head portion 29 of the dog F hereinbefore described, with the exception that the short arm 38 carries the pivoted shoe L, instead of a tooth.

The drum G is supported by the outer end portion of the long arm 37 of the lever, the shaft of the drum, which shaft is indicated by 39, resting on the outer end of this lever arm. The force transmitted to the clutch shoe by the weight of the drum on the lever M holds the shoe L in sufficiently tight contact with the clutch wheel K to hold the brakes applied, but this contact is not so tight as to prevent forcible rotation of the shaft 35 by manual operation of the hand wheel to either wind or unwind the brake chain.

I claim:

1. In a hand brake mechanism, the combination with a rotary chain winding element; of means for opposing rotation of said element including a member rotatable with said element and a gripping member constantly pressed against said first named member to resist rotation of the latter, said resistance afforded by said gripping member being ample to hold said first named member against rotation, due to the pull of the chain on the winding element; and manually actuated means connected to said first named member for rotating the same, the power transmitted by operation of said manually actuated means being sufficient to overcome the resistance against rotation of said second named member afforded by said gripping member.

2. In a hand brake mechanism, the combination with a rotary chain winding element; of a driving member for rotating said element; a ratchet wheel rotatable with said driving member; a dog engaging said ratchet wheel; means for pressing said dog against the ratchet wheel to hold the dog in locking engagement with said wheel; and manually actuated means connected to said driving member for rotating the same to force said dog to ratchet over said wheel.

3. In a hand brake mechanism, the combination with a rotary chain winding element; of a driving member for rotating said element; a clutch wheel rotatable with said driving member; a clutch shoe engaging said clutch wheel; means for pressing said clutch shoe against the clutch wheel with sufficient pressure to grip and hold the wheel against rotation; and manually actuated means connected to said driving member for rotating the same to overcome the resistance to movement between said clutch wheel and clutch shoe and rotate said driving member.

4. In a hand brake mechanism, the combination with a rotary chain winding element; of a member rotatable with said winding element; and a lever pivoted between its ends and having gripping means at one end thereof engaging said member to oppose rotation thereof, said winding element being supported by the other end of the lever, the weight of said element forcing the gripping means of the lever against said member with sufficient force to hold said member against rotation.

5. In a hand brake mechanism, the combination with a rotary chain winding element; of a ratchet wheel rotatable with said element; and a locking dog pivoted between its ends and having a tooth at one end engaging the ratchet wheel, said element being supported by the other end of the dog, the weight of said element forcing the toothed end of the dog against said ratchet wheel with sufficient force to lock said wheel against rotation.

6. In a hand brake mechanism, the combination with a rotary chain winding element; of a clutch wheel rotatable with said element; and a lever pivoted between its ends and having a clutch shoe at one end engaging said clutch wheel, said element being supported by the other end of the lever, the weight of said element forcing said clutch shoe against the ratchet wheel with sufficient force to hold said clutch wheel against rotation.

7. In a hand brake mechanism, the combination with a rotary chain winding element; of a clutch wheel rotatable with said element; a lever pivoted between its ends and having a clutch shoe at one end engaging said clutch wheel, said element being supported by the other end of the lever, the weight of said element forcing said clutch shoe against the ratchet wheel with sufficient force to hold said clutch wheel against rotation; and manually actuated means for rotating said winding element to overcome the gripping action of the clutch shoe.

8. In a hand brake mechanism, the combination with a rotary chain winding element; of a ratchet wheel rotatable with said element; a locking dog pivoted between its ends and having a tooth at one end engaging the ratchet wheel, said element being supported by the other end of the dog, the weight of said element forcing the toothed end of the dog against said ratchet wheel with sufficient force to lock said wheel against rotation, and manually actuated means for rotating said winding element to force said tooth of the dog out of engagement with the teeth of the ratchet wheel.

9. In a hand brake mechanism, the combination with a rotary chain winding element; of a rotary driving member for rotating said element; a ratchet wheel rotatable with said member; and a lever pivoted between its ends, said lever having a tooth at one end engaging said wheel, said winding element resting upon and being supported by the other end of said lever.

10. In a hand brake mechanism, the combination with a rotary chain winding element; of a rotary driving member operatively connected with the winding element to rotate the same; a member rotatable with said driving member; and a lever pivoted between its ends and having gripping means at one end thereof engaging said second named member, said winding element resting upon and being supported by the other end of the lever.

11. In a hand brake mechanism, the combination with a rotary chain winding element; of a rotary driving member operatively connected with the winding element to rotate the same; a clutch wheel rotatable with said driving member; and a lever pivoted between its ends and having a clutch shoe at one end thereof engaging said clutch wheel, said winding element resting upon and being supported by the other end of the lever.

12. In a hand brake mechanism, the combination with a rotary chain winding drum; of a gear rotatable with said drum; a pinion meshing with said gear; a ratchet wheel rotatable with said pinion; and a lever pivoted between its ends and having a tooth at one end engaging said ratchet wheel, said drum resting on and being supported by the other end of the lever.

13. In a hand brake mechanism, the combination with a rotary chain winding drum; of a gear rotatable with said drum; a pinion meshing with said gear; a clutch wheel rotatable with said pinion; and a lever pivoted between its ends and having a clutch shoe at one end engaging said clutch wheel, said drum resting on and being supported by the other end of the lever.

14. In a hand brake mechanism, the combination with a chain winding drum; of a horizontally disposed shaft to which said drum is fixed; a gear wheel fixed to said shaft; a pinion meshing with said gear wheel; a horizontally disposed shaft on which said pinion is fixed; a ratchet wheel fixed to said second named shaft; a lever below said pinion, said lever being pivoted between its ends for swinging movement about a horizontal axis; a tooth on one end of said lever engaging said ratchet wheel, said first named shaft resting on the other end of said lever to support said drum; and guide means within which said first named shaft is guided for up and down movement.

GEORGE E. DATH.

REFERENCES CITED

The following references are of record in the file of this patent:

UNITED STATES PATENTS

| Number | Name | Date |
|---|---|---|
| 1,925,240 | Fuchs | Sept. 5, 1933 |
| 2,132,080 | Nickliss | Oct. 4, 1938 |